United States Patent
Xing et al.

(10) Patent No.: US 6,465,080 B2
(45) Date of Patent: Oct. 15, 2002

(54) ELECTROPHOTOGRAPHIC MEDIA FOR USE IN HIGH SPEED COLOR COPIERS AND PRINTERS

(75) Inventors: Linlin Xing, West Warwick, RI (US); Betty Ann Lyon, Rehoboth, MA (US); Yongzhong Wang, Lincoln, RI (US); Jay C. Song, Highland Mills, NY (US)

(73) Assignee: Arkwright Incorporated, Fiskeville, RI (US)

(*) Notice: Subject to any disclaimer, the term of this patent is extended or adjusted under 35 U.S.C. 154(b) by 72 days.

(21) Appl. No.: 09/768,646

(22) Filed: Jan. 24, 2001

(65) Prior Publication Data
US 2002/0142137 A1 Oct. 3, 2002

(51) Int. Cl.$^7$ .......................... B32B 27/14; B32B 3/00
(52) U.S. Cl. .................. 428/195; 428/199; 428/204; 428/206; 428/212; 428/220; 428/323
(58) Field of Search .................. 428/195, 199, 428/204, 206, 212, 220, 323

(56) References Cited

U.S. PATENT DOCUMENTS 5,989,686 A * 11/1999 Song et al. .................. 428/195

* cited by examiner

*Primary Examiner*—Cynthia H. Kelly
*Assistant Examiner*—B. Shewareged
(74) *Attorney, Agent, or Firm*—Barlow, Josephs & Holmes, Ltd

(57) ABSTRACT

This invention relates to electrophotographic recording media that are suitable for use in high speed color copiers and printers. The media are composites comprising: a) a film substrate having a front surface coated with a toner-receptive layer and a back surface coated with a polymeric layer, and b) a paper backing that is attached to the back surface of the film substrate. The toner-receptive layer comprises a mixture of a hydrophobic toner-compatible polymer and hydrophilic toner-compatible polymer. The paper backing has a Sheffield Smoothness greater than 70 SU.

25 Claims, 1 Drawing Sheet

ELECTROPHOTOGRAPHIC MEDIA FOR USE IN HIGH SPEED COLOR COPIERS AND PRINTERS

BACKGROUND OF THE INVENTION

1. Field of the Invention

This invention relates to electrophotographic recording media that can be imaged in copiers and printers, particularly high-speed color copiers and printers. The imaged media are especially suitable for use as overhead projector transparencies.

2. Description of the Related Art

In recent years, there has been an increase in the number of color copiers, color laser copiers, and color laser printers installed in offices and schools. The availability of improved, low-cost copiers and printers has fueled this expansion. Today's machines are capable of producing high-quality multicolored images and text on paper and film media at high speeds. Offices and schools use these machines to print images on transparency films for overhead projector presentations. Such transparencies are commonly referred to as OHP transparencies in the imaging media industry.

For example, Xerox Docucolor 40 is a color copier capable of producing high-quality multicolored images on paper media with an average output speed of about 40 copies per minute. For OHP transparencies, the copying speed can be as high as 15 copies per minute.

Today's commercially-available OHP transparencies used in electrophotographic processes consist of a polymeric film substrate (e.g., polyethylene terephthalate film) coated with one or more layers of organic materials that are receptive to a toner composition. Toners contain a binder resin and toner particles. An image is fixed onto the transparency by electrostatically transferring and fusing the toner to the toner-receptive coating. Among other factors, surface conductivity of the toner-receptive coating is important in obtaining complete toner transfer and fusion. If surface resistivity is too high, the toner may not completely transfer resulting in imaging defects such as non-uniform colors. If surface resistivity is too low, white spots and deletions in the images can occur especially in highly humid environments. In addition to enhancing image quality, the toner-receptive coating also helps improve the transparency's copier/printer feeding performance, scratch and scuffing resistance, and mechanical strength. It should be noted that in contrast to conventional coated transparency films, the image quality and feeding performance of raw (i.e., non-coated) transparency films are poor.

As the output speed of color copiers and printers has increased, manufacturers of copiers and printers have raised the fusing temperature to ensure complete fixing of the image to the transparency sheet. Due to the high fusing temperatures in conventional copiers or printers, a transparency sheet develops a high electrical charge as it advances through the machine and is imaged. A transparency sheet in the feeding tray may become electrostatically attracted to the sheet advancing through the machine and move towards the advancing sheet causing the machine to jam. Further, when the transparency sheets are imaged and deposited on top of each other in the output tray, static electricity builds up between the stacked sheets. The imaged sheets may cling to each other making it difficult for an operator to jog and handle the sheets.

The industry is constantly attempting to develop new OHP transparencies. For example, Katsen et al., U.S. Pat. No. 5,939,193 discloses a transparent recording sheet useful in producing electrophotographic images for overhead projections. The recording sheet comprises a transparent polymeric base and imaging layer. The imaging layer comprises at least one resin and at least one transparentizer. The patent discloses that it is most preferred to use a phenoxy resin and a polycaprolactone resin in combination for the imaging layer.

Song et al., U.S. Pat. No. 5,989,686 discloses a color electrophotographic medium containing a polymeric base film having a toner-receptive coating on a side thereof. The toner-receptive coating comprises a) a low molecular weight toner-compatible resin segment such as bisphenol A—epichlorohydrin-based epoxy resin, b) a high molecular weight thermoplastic resin segment such as polyvinyl chloride or polyvinylidene chloride, c) polymeric particulate, and d) an anti-static agent. The 686 Patent discloses that the non-imaging side of the base film is preferably coated with a polymeric anti-static coating.

Some conventional OHP transparencies consist of a film substrate attached to a paper backing. The front (imaging) surface of such films may be coated with a variety of materials, but the back (non-imaging) surface does not possess a coating. Although some conventional OHP transparencies perform adequately in low-speed color copiers and printers, the industry is demanding transparencies that will perform well in high-speed color copiers and printers. The transparencies should be capable of forming high-quality multicolored images at high feed and output rates with minimum jamming problems. After imaging, an operator should be able to easily jog and handle the transparency sheets with minimum static-electricity problems. The present invention provides such transparencies.

SUMMARY OF THE INVENTION

The present invention relates to an electrophotographic recording medium comprising: a) a film substrate having a front surface (i.e., imaging surface) coated with a toner-receptive layer comprising about 55 to about 95% by weight of a hydrophobic toner-compatible polymer, and about 5 to about 45% by weight of a hydrophilic toner-compatible polymer based on total dry weight of the toner-receptive layer, and a back surface (non-imaging surface) coated with a polymeric layer comprising a material selected from the group consisting of particles, anti-static agents, and mixtures thereof; and b) a paper backing adhered to a portion of the back surface of the film substrate, wherein each surface of the paper backing has a Sheffield Smoothness greater than 70 Sheffield Units (SU).

Preferably, the surface contact angle of the coated front surface is no greater than about 35 and more preferably no greater than 30. Preferably, the toner-receptive layer and polymeric layer are prepared from aqueous coatings.

Suitable hydrophobic toner-compatible polymers include, for example, acrylics, bisphenol A—epichlorohydrin based epoxy, polyvinyl chloride, polyvinylidene chloride, and a hydroxyl modified copolymer of vinyl chloride and vinyl acetate. Suitable hydrophilic toner-compatible polymers include, for example, polyethylene glycol, polyethylene oxide, polypropylene oxide, and poly(2-ethyl-2-oxazoline).

In addition, the toner-receptive layer may comprise particles preferably in an amount of about 0.1 to about 5% by weight based on total dry weight of the toner-receptive layer. Suitable particles for the toner-receptive layer include silica, calcium carbonate, kaolin, aluminum hydroxide, starch, polystyrene, poly(methyl methacrylate), polyurethane, polyethylene, polyolefin waxes, polytetrafluoroethylene, and mixtures thereof. The toner-receptive layer may further comprise anti-static agents preferably in an amount of about 0.1 to about 10% by weight based on total dry weight of the toner-receptive layer. Suitable anti-static agents include cationically or anionically conductive polymers.

The polymeric layer coated on the back surface of the film may comprise particles such as silica, calcium carbonate, kaolin, aluminum hydroxide, starch, polystyrene, poly(methyl methacrylate), polyurethane, polyethylene, polyolefin waxes, polytetrafluoroethylene, and mixtures thereof. In other embodiments, the polymeric layer comprises anti-static agents such as cationically or anionically conductive polymers. The polymeric layer may also comprise a mixture of the above-mentioned particles and anti-static agents. Preferably, the amount of anti-static agent is in the range of about 0.1 to about 10% by weight, and the amount of particles is in the range of about 0.1 to about 5% by weight based on total dry weight of the polymeric layer.

Preferably, each surface of the conductive paper backing has a surface resistivity of less than $100 \times 10^{11}$ ohms/square, and it is more preferably in the range of about $1 \times 10^1$ to about $50 \times 10^{11}$ ohms/square. The paper backing may have a Sheffield Smoothness of at least 100 SU and preferably has a thickness of about 2 to about 7 mils. A vellum white paper is a particularly preferred paper backing.

The film substrate can be a transparent, translucent, or opaque film and typically has a thickness of about 1 to about 10 mils. A transparent polyester film is particularly preferred.

DETAILED DESCRIPTION OF THE PREFERRED EMBODIMENT

Figure 1:
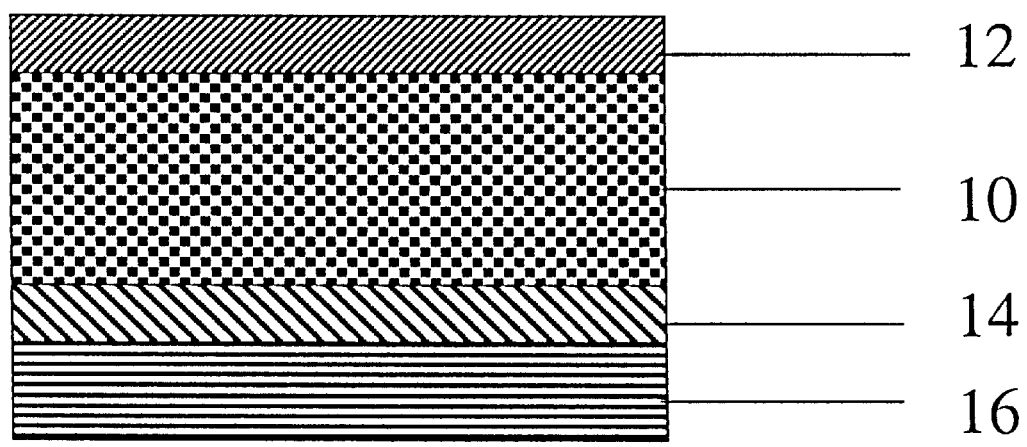
FIG. 1 is a schematic side view of the preferred embodiment of the electrophotographic recording medium of this invention.

The present invention relates to an electrophotographic recording medium comprising: a) a film substrate having a front surface coated with a toner-receptive layer and a back surface coated with a polymeric layer and b) a paper backing adhered to the back surface of the film substrate.

Referring to FIG. 1, the film substrate 10 is made of a polymeric material having suitable physical characteristics so that it is resistant to tearing and thermal damage that may be caused by heat in the copier or printer. Suitable polymeric materials include thermoplastic polymers, such as polyesters, polysulfone, poly(vinyl chloride), polyvinyl acetate, polycarbonates, polymethylmethacrylate, cellulose esters, fluoropolymers and the like. Transparent, translucent, or opaque films may be used. A transparent polyethylene terephthalate (PET) film is particularly preferred. The thickness of the base film is not particularly restricted, but should be generally in the range of about 1 to about 10 mils and is most preferably about 4 mils. The film substrate has two surfaces. The first surface, which is coated with a toner-receptive layer, may be referred to as the "front surface" or "imaging surface", and the opposite surface may be referred to as the "back surface" or "non-imaging surface." The film substrate may be pretreated with conventional adhesion promoters on one surface or both surfaces to enhance adhesion of the coating layers to the film.

The toner-receptive layer 12 comprises from about 55 to about 95% by weight of at least one hydrophobic toner-compatible polymer based on total dry weight of the toner-receptive layer. By the term, "hydrophobic", as used herein, it is meant that the polymer has a surface contact angle with water of greater than about 35 as measured per the Test Methods described below. By the term, "toner-compatible", as used herein, it is meant that the polymer is receptive to the toner allowing the toner to effectively adhere and fuse to the coating on the film substrate. Suitable hydrophobic toner-compatible polymers include, for example, acrylic resins, epoxy resins such as bisphenol A—epichlorohydrin based epoxy resin, polyvinyl chloride, polyvinylidene chloride and a hydroxyl modified copolymer of vinyl chloride and vinyl acetate. Preferably, an aqueous dispersion of a bisphenol A—epichlorohydrin based epoxy resin, such as EPI-REZ 3540-WY-55 available from Shell Chemical Company, is used. An aqueous emulsion of acrylic resin, such as JON-CRYL 1907 available from SC Johnson, may also be used.

The toner-receptive layer further comprises from about 5 to about 45% by weight of at least one hydrophilic toner-compatible polymer based on total dry weight of the toner-receptive layer. By the term, "hydrophilic", as used herein, it is meant that the polymer has a surface contact angle with water of no greater than about 35 as measured per the Test Methods described below. Suitable hydrophilic toner-compatible polymers include, for example, polyethylene glycol, polyethylene oxide, polypropylene oxide, poly(2-ethyl-2-oxazoline), and low melting point poly(vinyl alcohols). Typically, the hydrophilic toner-compatible polymer used in the present invention is non-ionic.

Preferably, the toner-receptive layer contains an anti-static agent for controlling the transparency's surface electrical properties. Particularly, the anti-static agent provides two major benefits: 1) it provides a means to control any static electricity build-up that may occur during the feeding, imaging, and handling of the transparencies; and 2) it modifies the electrical properties of the transparency film so that the toner can be effectively transferred to the transparency's surface. Poorly controlled electrical properties on the imaging surface can lead to imaging defects such as image break-ups, deletions, and mottles.

The toner-receptive layer preferably contains anti-static agents in an amount of about 0.1 to about 10% by weight based on total dry weight of the toner-receptive layer. Suitable anti-static agents include quaternary salt type cationic anti-static agents such as CYAGUARD 609, CYAGUARD LS, CYAGUARD SP and CYAGUARD SN available from Cytec Industries. Cationically conductive polymers such as dimethyl diallyl ammonium chloride, dimethyl diallylammonium chloride/diacetone acrylamide copolymers, dimethyl diallyl ammonium chloride/n-methanol acrylamide copolymers, polyvinyl benzyl trimethyl ammonium chloride, polyethyleneimine hydrochloride, poly(2-acryloxyethyldimethyl) sulfonium chloride, polyglycidyl tributyl phosphonium chloride, cationic cellulosic ethers, and the like can be used. Useful anionically conductive polymers include polystyrene sulfonic acid, sulfonated styrene/maleic anhydride copolymer, polyacrylic acid, polymethacrylic acid, polyvinyl phosphate, and free acids thereof, or the like.

In addition, the toner-receptive layer may comprise organic or inorganic particles primarily for the purpose of controlling the transparency's surface frictional properties. The particles are also useful for preventing imaging defects such as image or ink blocking and reducing static electricity build-up. The toner-receptive layer preferably contains particles in an amount of about 0.1 to about 5% by weight based on total dry weight of the toner-receptive layer. Useful particles include silica, calcium carbonates, kaolin, aluminum hydroxide, starch, polystyrene, poly(methyl methacrylate), polyurethane, polyethylene, polyolefin waxes, polytetrafluoroethylene, and the like. Preferably, the particles have an average particle diameter size in the range of 1 to 20 microns.

Coating additives, such as wetting agents, de-foaming agents, anti-foaming agents, and dispersing agents, may also be incorporated to improve toner-receptive layer properties and application of the coating onto the film substrate. Preferred surface wetting agents include BYK 348 and 346 (polyether modified dimethyl polysiloxane copolymers available from BYK-Chemie), FC-430 (fluorocarbon surface active agent available from 3M), and TEGO WET 250 and 260 (polyether modified dimethyl polysiloxane copolymers available from TEGO-Chemie). Preferred defoamers include DREWPLUS L-407 foam control agent (an emulsion of modified polysiloxane copolymer available from Drew Chemical Corp., and TEGO FOAMEX 815 and 805 (nonionic O/W emulsion of a polysiloxane-polyether copolymers available from TEGO-Chemie).

Preferably, the coated front surface, i.e., the surface coated with the toner-receptive layer, has a surface contact angle of no greater than about 35 and more preferably less than 30. As a comparison, non-coated transparency films, i.e., films not coated with any toner-receptive layer, typically have a highly hydrophobic surface with a surface contact angle greater than about 60.

A polymeric layer 14 is coated on the back surface of the film substrate. The polymeric layer comprises a material selected from the group consisting of particles, anti-static agents, and mixtures thereof.

The polymeric layer may comprise particles selected from the group consisting of silica, calcium carbonate, kaolin, aluminum hydroxide, starch, polystyrene, poly(methyl methacrylate), polyurethane, polyethylene, polyolefin waxes, polytetrafluoroethylene, and mixtures thereof. In other embodiments, the polymeric layer comprises anti-static agents such as cationically or anionically conductive polymers. In still other embodiments, the polymeric layer comprises a mixture of particles and anti-static agents. If an anti-static agent is used, it is preferably used in an amount of about 0.1 to about 10% by weight based on total dry weight of the toner-receptive layer. If particles are used, they are preferably used in an amount of about 0.1 to about 5% by weight based on total dry weight of the toner-receptive layer.

The polymeric layer further comprises a binder resin, for example, an acrylic resin, polyvinyl chloride, vinyl acetate copolymers, polystyrene, and the like. In addition, coalescing agents such as n-butyl glycol ether, and wetting and dispersing agents may be used to prepare the polymeric coating formulation.

Preferably, the toner-receptive and polymeric layers are prepared using aqueous-based coating formulations, wherein water is a primary component. Aqueous coating formulations are preferred, because the hydrophilic resins used in the formulations are water-soluble. Alternatively, non-aqueous-based coating formulations can be used, but they are less preferred, because they are less stable over extended periods of time (i.e., they have a shorter pot life.)

The toner-receptive and polymeric layers may be coated onto the film substrate using any method known in the art including roller coating, rod coating, doctor coating, gravure coating, slot-die coating, wire-bar coating, dip-coating and air-knife coating. Typically, the coat weight of the toner-receptive layer is in the range of about 1 to about 1.5 grams per square meter (gsm) and the coat weight of the polymeric layer on the back surface is in the range of about 0.5 to about 1.2 gsm.

In the present invention, a paper backing 16 is adhered to a portion of the back surface of the film substrate. As described further below, the paper backing may be adhered to the top edge, bottom edge, side edge, or any other portion of the film substrate. The paper backing has two surfaces. The first surface of the paper backing, which is adhered to the film substrate, may be referred to as the "inner surface", and the opposite surface may be referred to as the "outer surface".

It has been found that not all paper backings are suitable for constructing the media of this invention. Particularly, it has been found that each surface (inner and outer) of the paper backing should have a Sheffield Smoothness greater than 70 Sheffield Units (SU). Preferably, the inner and outer surfaces of the paper backing have a Sheffield smoothness of at least 100 SU.

Preferably, each surface (inner and outer) of the paper backing has a surface resistivity less than $1000 \times 10^{11}$ ohms/square at 50% relative humidity (RH), and the surface resistivity is more preferably less than $100 \times 10^{11}$ ohms/square. In one embodiment of this invention, the inner and outer surfaces of the paper backing have a surface resistivity in the range of about $1 \times 10^{11}$ to about $50 \times 10^{11}$ ohms/square. The thickness of the paper backing is preferably in the range of about 2 to about 7 mils, and the paper backing has high tear strength.

Suitable paper backings include for example: (a) vellum white high rag content (e.g., 100%) paper, vellum white low rag content (e.g., 25%) paper, and translucent bond paper available from Esleeck Manufacturing; (b) Ardor bond 16 lb., 20 lb., and 24 lb. papers available from Georgia Pacific; and (c) Mosinee 37 lb. and 45 lb. papers available from Mohawk. Typically, the paper backings have a weight in the range of about 60 to about 75 grams/square meter (gsm). Vellum white 100% rag paper having an average weight of about 73 gsm is particularly preferred.

The paper backing may be adhered to the back surface of the transparent film by a conventional adhesive. For example, rubber-based adhesives may be used. The adhesive coating may be applied by conventional techniques such as direct gravure coating. There must be a sufficiently high "peel strength" between the transparent film and the paper backing so that the composite medium (film and paper backing) can be readily stored, handled, and fed to copiers and printers. However, the peel strength of the composite must not be excessively high, since an operator typically peels the film off the paper backing after imaging. The film should be capable of being removed easily and cleanly. No adhesive residue should be visible on the film after it is removed. Preferably, the peel strength of the composite medium of this invention is in the range of about 2 to about 20 grams.

The composite media of this invention can be fed into color copiers and printers at high speeds to form images having good color density, brilliance, and resolution. The imaged transparency sheets have low static electricity levels and can be easily jogged and handled.

The invention is further illustrated by the following examples using the below Test Methods, but these examples should not be construed as limiting the scope of the invention.

TEST METHODS

Surface Resistivity

The surface resistivity of the samples at 50% relative humidity (RH) was measured using a Keithley Model 485 auto-ranging picoammeter with a Keithley Model 6105 resistivity adapter and a Keithley Model 247 high voltage supply available from Keithley Instruments, Inc. according to the manufacturer's standard instruction manual. The surface resistivities of the paper backings were measured after the paper backings were adhered to the film substrates.

Surface Contact Angle

The surface contact angles of the hydrophobic and hydrophilic polymers and toner-receptive coatings were measured with water using a FTA 200 Dynamic Contact Angle Analyzer available from First Ten Angstrom, Inc. according to the manufacturer's standard instruction manual. Generally, a material's surface contact angle with water is an indication of the hydrophobicity and hydrophilicity of the material. A relatively high surface contact angle indicates a more hydrophobic surface, while a relatively low surface contact angle indicates a more hydrophilic surface.

Sheffield Smoothness

The Sheffield Smoothness of the paper backing was measured using a Hagerty Smoothness Tester (Model 538, Hagerty Technologies, Inc.) according to the manufacturer's standard instruction manual. Generally, the Sheffield Smoothness of a paper is an indication of the roughness of the paper. A relatively high Sheffield Smoothness value indicates a rougher surface, while a relatively low Sheffield Smoothness value indicates a smoother surface. The Sheffield Smoothness of the paper backings were measured after the paper backings were adhered to the film substrates.

Static Electricity Level

The transparency sheets were fed through a Xerox DocuColor 40 color copier and imaged using a heavy weight paper mode at an output speed of about 15 copies per minute (cpm) under ambient conditions. The copier deposited the imaged sheets into its collection tray. Within about one (1) minute after the first sheet was imaged, the operator removed a stack of about 10 imaged sheets from the collection tray, and the sheets were evaluated to determine their level of static-electricity and electrostatic attraction to each other. The level of static-electricity (low, moderate, or high) was based on the operator manually jogging and handling the stack of sheets.

Color Quality

As described above, the transparency sheets were fed through a Xerox DocuColor 40 color copier and imaged using a heavy weight paper mode at an output speed of about 15 copies per minute (cpm) under ambient conditions. The sheets were imaged with a print test pattern comprising colored squares (blocks). The test pattern included blocks of solid primary colors (cyan, magenta, yellow, and black) and primary color blends (red, green, violet, and composite black). The percentage light transmission of a light yellow-colored block was measured using a BYK Gardner Hazeguard Plus instrument (BYK Gardner) according to the manufacturer's standard instruction manual.

Average values are reported in Table 1 below. Generally, the color quality of a projected transparency having a higher % light transmission is greater than a projected transparency having a lower % light transmission.

EXAMPLES

In the following Examples, parts refer to weight percentages based on the weight of ingredients in the formulations.

Example 1

The following coating formulation was prepared.

| | |
|---|---|
| Water | 77 parts |
| Isopropyl alcohol | 1.50 parts |
| SYLOID 162[1] | 0.15 parts |
| PEG 35,000[2] | 1.75 parts |
| EPI-REZ 3540-WY-55[3] | 18 parts |
| CYASTAT 609[4] | 1.50 parts |
| BYK 346[5] | 0.10 parts |

[1]Silica pigment particles, available from Grace-Davison.
[2]Polyethylene glycol 35,000 available from Fluka.
[3]Aqueous dispersion of EPON 1007 epoxy resin available from Shell Chemical Company.
[4]Quaternary salt type cationic anti-static agent available from Cytec Industries, Inc.
[5]Polyether modified polydimethylsiloxane copolymer wetting agent available from BYK-Chemie.

The surface contact angle of a coating containing only EPI-REZ 3540-WY-55 was measured, and it was about 66 degrees. The surface contact angle of a coating containing only PEG 35,000 was measured, and it was about 16 degrees.

Example 2

The following coating formulation was prepared.

| | |
|---|---|
| Water | 79 parts |
| Isopropyl alcohol | 1.10 parts |
| SYLOID 162[1] | 0.15 parts |
| POLYOX WSR N-80[2] | 3 parts |
| JONCRYL 1907[3] | 15 parts |
| CYASTAT 609[4] | 1.75 parts |

[1]Silica pigment particles, available from Grace-Davison.
[2]Polyethylene oxide available from Union Carbide.
[3]Acrylic emulsion available from SC Johnson.
[4]Quaternary salt type cationic anti-static agent available from Cytec Industries, Inc.

The surface contact angle of a coating containing only JONCRYL 1907 was measured, and it was about 74 degrees. The surface contact angle of a coating containing only POLYOX WSR N-80 was measured, and it was about 18 degrees.

Example 3

The following coating formulation was prepared.

| | |
|---|---|
| Water | 80 parts |
| PnB Solvent[1] | 1 part |
| RHOPLEX P-376[2] | 8 parts |
| RHOPLEX AC-73T[3] | 8.60 parts |
| CHEMISTAT 7300[4] | 2.35 parts |
| SYLOID 162[5] | 0.05 parts |

[1]N-butyl glycol ether available from Dow Chemical Company.
[2]Acrylic emulsion available from Rhom and Haas.
[3]Acrylic emulsion available from Rhom and Haas.
[4]Cationic conductive polymer available from Sanyo Chemical Company.
[5]Silica pigment particles, available from Grace-Davison.

Example 4

The following coating formulation was prepared.

| | |
|---|---|
| Water | 81 parts |
| PnB Solvent | 1 part |
| RHOPLEX P-376 | 8 parts |
| RHOPLEX AC-73T | 8.6 parts |
| CHEMISTAT 7300 | 1.35 parts |
| SYLOID 162 | 0.05 parts |

Example 5

The following coating formulation was prepared.

| | |
|---|---|
| Water | 81 parts |
| PnB Solvent | 1 part |
| RHOPLEX AC-73T | 17.70 parts |
| CHEMISTAT 7300 | 0.25 parts |
| SYLOID 162 | 0.05 parts |

Example 6

The following coating formulation was prepared.

| | |
|---|---|
| Water | 80.50 parts |
| PnB Solvent | 1.27 part |
| RHOPLEX AC-73T | 18.20 parts |
| SYLOID 162 | 0.03 parts |

Example 7

The following coating formulation was prepared.

| | |
|---|---|
| Water | 80.2 parts |
| PnB Solvent | 1 part |
| RHOPLEX AC-73T | 17.8 parts |
| CHEMISTAT 7300 | 1 part |

Example 8

The coating formulation of above Example 1 was applied to the front surface of a MELINEX film (a polyethylene terephthalate film available from DuPont/Teijin Films) to form a toner-receptive layer. The toner-receptive layer contained about 79% by weight of EPI-REZ 3540-WY-55 (a hydrophobic toner-compatible polymer), and about 14% by weight of PEG 35,000 (a hydrophilic toner-compatible polymer) based on total dry weight of the toner-receptive layer.

The coating formulation of above Example 3 was applied to the back surface of the film to form a polymeric layer. The polymeric layer contained about 0.6% by weight of SYLOID 162 (silica pigment particles) and about 7% by weight of CHEMISTAT 7300 (an anti-static agent) based on total dry weight of the polymeric layer.

The formulations were coated onto the film and the coatings dried at about 120° C. for about ninety (90) seconds.

A vellum white paper (100% rag content), available from Esleeck Manufacturing, was adhered to the film using MORTSTIK 125-HP, a rubber-based adhesive available from Morton International, Inc., to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

The surface contact angle of the film's coated front surface was measured (with water), and it was about 9 degrees.

Example 9

The coating formulation of above Example 2 was applied to the front surface of a MELINEX film to form a toner-receptive layer.

The toner-receptive layer contained about 63% by weight of JONCRYL 1907 (a hydrophobic toner-compatible polymer), and about 27% by weight of POLYOX WSR N-80 (a hydrophilic toner-compatible polymer) based on total dry weight of the toner-receptive layer.

The coating formulation of above Example 3 was applied to the back surface of the film to form a polymeric layer. The polymeric layer contained about 0.6% by weight of SYLOID 162 (silica pigment particles) and about 7% by weight of CHEMISTAT 7300 (an anti-static agent) based on total dry weight of the polymeric layer.

The formulations were coated onto the film and the coatings dried at about 120° C. for about ninety (90) seconds.

A vellum white paper (100% rag content), available from Esleeck Manufacturing, was adhered to the film using MORTSTIK 125-HP to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

The surface contact angle of the film's coated front surface (with water) was measured, and it was about 12 degrees.

Example 10

The coating formulation of above Example 1 was applied to the front surface of a MELINEX film (a polyethylene terephthalate film available from DuPont/Teijin Films) to form a toner-receptive layer.

The coating formulation of above Example 4 was applied to the back surface of the film to form a polymeric layer. The polymeric layer contained about 0.6% by weight of SYLOID 162 (silica pigment particles) and about 4% by weight of CHEMISTAT 7300 (an anti-static agent).

The formulations were coated onto the film and the coatings dried at about 120° C. for about ninety (90) seconds.

A vellum white paper (100% rag content), available from Esleeck Manufacturing, was adhered to the film using MORTSTIK 125-HP to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

Example 11

The coating formulation of above Example 1 was applied to the front surface of a MELINEX film (a polyethylene terephthalate film available from DuPont/Teijin Films) to form a toner-receptive layer.

The coating formulation of above Example 5 was applied to the back surface of the film to form a polymeric layer. The polymeric layer contained about 0.6% by weight of SYLOID 162 (silica pigment particles) and about 1% by weight of CHEMISTAT 7300 (an anti-static agent).

The formulations were coated onto the film and the coatings dried at about 120° C. for about ninety (90) seconds.

A vellum white paper (100% rag content), available from Esleeck Manufacturing, was adhered to the film using MORTSTIK 125-HP to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

Example 12

The coating formulation of above Example 1 was applied to the front surface of a MELINEX film (a polyethylene terephthalate film available from DuPont/Teijin Films) to form a toner-receptive layer.

The coating formulation of above Example 6 was applied to the back surface of the film to form a polymeric layer. The polymeric layer contained about 0.3% by weight of SYLOID 162 (silica pigment particles) and no anti-static agent.

The formulations were coated onto the film and the coatings dried at about 120° C. for about ninety (90) seconds.

A vellum white paper (100% rag content), available from Esleeck Manufacturing, was adhered to the film using MORTSTIK 125-HP to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

Example 13

The coating formulation of above Example 1 was applied to the front surface of a MELINEX film (a polyethylene terephthalate film available from DuPont/Teijin Films) to form a toner-receptive layer.

The coating formulation of above Example 7 was applied to the back surface of the film to form a polymeric layer. The polymeric layer contained about 3% by weight of CHEMISTAT 7300 (an anti-static agent) and no particles.

The formulations were coated onto the film and the coatings dried at about 120° C. for about ninety (90) seconds.

A vellum white paper (100% rag content), available from Esleeck Manufacturing, was adhered to the film using MORTSTIK 125-HP to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

Comparative Example A

As described in above Example 8, the coating formulation of Example 1 was applied to the front surface of a MELINEX film and the coating formulation of Example 3 was applied to the film's back surface.

In contrast to Example 8, a Mohawk 10-780 paper, available from Mohawk Paper, was adhered to the film using MORTSTIK 125-HP. The Mohawk 10-780 paper backing had a Sheffield Smoothness of 59.5 SU (inner) and 68.2 SU (outer), and a surface resistivity of about $0.79 \times 10^{11}$ ohms/square (inner) and $0.20 \times 10^{11}$ ohms/square (outer).

Comparative Example B

As described in above Example 8, the coating formulation of Example 1 was applied to the front surface of a MELINEX film and the coating formulation of Example 3 was applied to the film's back surface.

In contrast to Example 8, a Mohawk 10-734 paper, available from Mohawk Paper, was adhered to the film using MORTSTIK 125-HP. The paper backing had a Sheffield Smoothness of 40.4 SU (inner) and 38.1 SU (outer), and a surface resistivity of about $5 \times 10^{11}$ ohms/square (inner) and $5 \times 10^{11}$ ohms/square (outer).

Comparative Example C

Commercially-available transparency sheets from Xerox Corp. ("Hi-Speed Paper-Backed/Clear Transparencies" Reorder No. 3R3028) were evaluated. The sheets contained a polymeric coating on their front surfaces but did not have a coating on their back surfaces.

The commercially-available transparency sheets were composites having a paper backing. The paper backing had a Sheffield smoothness of 172 SU (inner) and 133 SU (outer), and a surface resistivity of $12.5 \times 10^{11}$ ohms/square (inner) and $3.16 \times 10^{11}$ ohms/square (outer)).

The surface contact angle of the film's coated front surface was measured (with water), and it was about 79 degrees.

Comparative Example D

The coating formulation of above Example 1 was applied to the front surface of a MELINEX film (a polyethylene terephthalate film available from DuPont/Teijin Films) to form a toner-receptive layer.

The back surface of the film was not coated with any coating formulation. A vellum white paper (100% rag content), available from Esleeck Manufacturing, was adhered to the film using MORTSTIK 125-HP to form a paper-backing. The paper-backing had a Sheffield smoothness of 184 SU (inner) and 140 SU (outer), and a surface resistivity of $15.8 \times 10^{11}$ ohms/square (inner) and $2.51 \times 10^{11}$ ohms/square (outer).

Comparative Example E

Commercially-available transparency sheets from Minnesota Mining and Manufacturing Co. (3M) ("Transparency Film for Copiers" No. PP2410) were evaluated. The sheets contained a polymeric coating on their front surfaces but did not have a coating on their back surfaces.

The commercially-available transparency sheets were composites having a paper backing had a Sheffield smoothness of 168 SU (inner), and 157 (outer) and a surface resistivity of surface resistivity of $0.79 \times 10^{11}$ ohms/square (inner) and $0.79 \times 10^{11}$ ohms/square (outer)). The surface contact angel of the film's coated front surface was measured (with water), and it was about 43 degrees.

TABLE 1

| Example | Toner-Receptive Layer (Face) | Polymeric Layer (Back) | Paper Backing | Static Electricity Level | Color Quality Light Trans. |
|---|---|---|---|---|---|
| Example 8 | EPI 3540/PEG (Ex. 1) | Chemistat 7300/ Syloid (Ex. 3) | Vellum White (100% rag) | Low | 57.2% |
| Example 9 | Joncryl 1907/ Polyox (Ex. 2) | Chemistat 7300/ Syloid (Ex. 3) | Vellum White (100% rag) | Low | 87.5% |
| Example 10 | EPI 3540/PEG (Ex. 1) | Chemistat 7300/ Syloid (Ex. 4) | Vellum White (100% rag) | Low | 57.2% |
| Example 11 | EPI 3540/PEG (Ex. 1) | Chemistat 7300 / Syloid (Ex. 5) | Vellum White (100% rag) | Low | 57.2% |
| Example 12 | EPI 3540/PEG (Ex. 1) | Syloid 162 (Ex. 6) | Vellum White (100% rag) | Low–Moderate | 57.2% |
| Example 13 | EPI 3540/PEG (Ex. 1) | Chemistat 7300 (Ex. 7) | Vellum White (100% rag) | Low–Moderate | 57.2% |
| Comparative A | EPI 3540/PEG (Ex. 1) | Chemistat 7300/ Syloid (Ex. 3) | Mohawk 10-780 | High | 57.2% |
| Comparative B | EPI 3540/PEG (Ex. 1) | Chemistat 7300/ Syloid (Ex. 3) | Mohawk 10-734 | High | 57.2% |
| Comparative C | Commercial Xerox 3R3028 | None | Commercial | High | 53.0% |
| Comparative D | EPI 3540/PEG (Ex. 1) | None | Vellum White (100% rag) | Moderate–High | 57.2% |
| Comparative E | Commercial 3M PP2410 | None | Commercial | Low | 53.9%* |

*Odor detected from transparencies during imaging.

What is claimed is:

1. An electrophotographic recording medium, comprising:
   a) a film substrate having a front surface coated with a toner-receptive layer comprising about 55 to about 95% by weight of a hydrophobic toner-compatible polymer, and about 5 to about 45% by weight of a hydrophilic toner-compatible polymer; and a back surface coated with a polymeric layer comprising a material selected from the group consisting of particles, anti-static agents, and mixtures thereof; and
   b) a paper backing adhered to a portion of the back surface of the film substrate, wherein each surface of the paper backing has a Sheffield Smoothness greater than 70 SU.

2. The recording medium of claim 1, wherein the hydrophobic toner-compatible polymer is selected from the group consisting of acrylics, bisphenol A—epichlorohydrin based epoxy, polyvinyl chloride, polyvinylidene chloride and a hydroxyl modified copolymer of vinyl chloride and vinyl acetate.

3. The recording medium of claim 1, wherein the hydrophilic toner-compatible polymer is selected from the group consisting of polyethylene glycol, polyethylene oxide, polypropylene oxide, and poly(2-ethyl-2-oxazoline).

4. The recording medium of claim 1, wherein the toner-receptive layer further comprises about 0.1 to about 10% by weight of an anti-static agent.

5. The recording medium of claim 4, wherein the anti-static agent is selected from the group consisting of cationically conductive polymers, anionically conductive polymers, and mixtures thereof.

6. The recording medium of claim 1, wherein the toner-receptive layer further comprises about 0.1 to about 5% by weight of particles.

7. The recording medium of claim 6, wherein the particles are selected from the group consisting of silica, calcium carbonate, kaolin, aluminum hydroxide, starch, polystyrene, poly(methyl methacrylate), polyurethane, polyethylene, polyolefin waxes, polytetrafluoroethylene particles, and mixtures thereof.

8. The recording medium of claim 1, wherein each surface of the paper backing has a surface resistivity of less than $100 \times 10^{11}$ ohms/square.

9. The recording medium of claim 8, wherein each surface of the paper backing has a surface resistivity in the range of about $1 \times 10^{11}$ to about $50 \times 10^{11}$ ohms/square.

10. The recording medium of claim 1, wherein each surface of the paper backing has a Sheffield Smoothness of at least 100 SU.

11. The recording medium of claim 10, wherein the paper backing is a vellum white paper.

12. The recording medium of claim 10, wherein the paper backing has a thickness of about 2 to about 7 mils.

13. The recording medium of claim 1, wherein the polymeric layer coated on the back surface of the film comprises about 0.1 to about 10% by weight of an anti-static agent.

14. The recording medium of claim 13, wherein the anti-static agent is selected from the group consisting of cationically conductive polymers, anionically conductive polymers, and mixtures thereof.

15. The recording medium of claim 1, wherein the polymeric layer coated on the back surface of the film comprises about 0.1 to about 5% by weight of particles.

16. The recording medium of claim 15, wherein the particles are selected from the group consisting of silica, calcium carbonate, kaolin, aluminum hydroxide, starch, polystyrene, poly(methyl methacrylate), polyurethane, polyethylene, polyolefin waxes, polytetrafluoroethylene particles, and mixtures thereof.

17. The recording medium of claim 1, wherein the film substrate is a transparent, translucent, or opaque film.

18. The recording medium of claim 17, wherein the film substrate is a transparent film.

19. The recording medium of claim 17, wherein the film substrate is a transparent polyester film.

20. The recording medium of claim 17, wherein the film substrate has a thickness of about 1 to about 10 mils.

21. The recording medium of claim 1, wherein the toner-receptive layer and polymeric layer are prepared from aqueous coatings.

22. An electrophotographic recording medium, comprising:
   a) a film substrate having a front surface coated with a toner-receptive layer, wherein the surface contact angle of the coated front surface is no greater than about 35, and a back surface coated with a polymeric layer comprising a material selected from the group consisting of particles, anti-static agents, and mixtures thereof; and b) a paper backing adhered to a portion of the back surface of the film substrate, wherein each surface of the paper backing has a Sheffield Smoothness greater than 70 SU.

23. The recording medium of claim 22, wherein the surface contact angle is no greater than about 30.

24. The recording medium of claim 22, wherein the toner-receptive layer comprises about 55 to about 95% by weight of a hydrophobic toner-compatible polymer; and about 5 to about 45% by weight of a hydrophilic toner-compatible polymer.

25. The recording medium of claim 22, wherein the toner-receptive layer and polymeric layer are prepared from aqueous coatings.

* * * * *